(12) United States Patent
Magata et al.

(10) Patent No.: US 7,577,392 B2
(45) Date of Patent: Aug. 18, 2009

(54) IMAGE READING APPARATUS AND IMAGE FORMING APPARATUS PROVIDED WITH THE SAME

(75) Inventors: Shoko Magata, Toride (JP); Takeshi Aoyama, Abiko (JP); Ayumu Murakami, Abiko (JP); Yuichi Yamamoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 11/236,301

(22) Filed: Sep. 26, 2005

(65) Prior Publication Data
US 2006/0066923 A1    Mar. 30, 2006

(30) Foreign Application Priority Data
Sep. 28, 2004  (JP)  ............................. 2004-281401
Oct. 1, 2004   (JP)  ............................. 2004-290774

(51) Int. Cl.
G03G 15/00    (2006.01)

(52) U.S. Cl. .................. 399/367; 399/371; 399/372; 399/373; 399/374; 355/23; 271/186

(58) Field of Classification Search ................ 399/374, 399/371, 372, 373, 367; 355/23; 271/186
See application file for complete search history.

(56) References Cited

U.S. PATENT DOCUMENTS

| 4,777,511 | A  | * | 10/1988 | Takahashi | .................. 399/374 |
| 6,795,160 | B2 |   | 9/2004  | Fukusaka  |                           |
| 2004/0062580 | A1 | * | 4/2004 | Kawai    | ........................ 399/367 |

FOREIGN PATENT DOCUMENTS

| CN | 1471039   A | 1/2004 |
| JP | 2002-049188 A | 2/2002 |
| JP | 2003-046728 A | 2/2003 |
| JP | 1471039   A | 1/2004 |
| JP | 2004-173022 A | 6/2004 |

OTHER PUBLICATIONS

Relevant Portion of Chinese Office Action issued for counterpart Chinese Patent Application No. 2005101054885, dated Apr. 6, 2007.

* cited by examiner

*Primary Examiner*—Judy Nguyen
*Assistant Examiner*—Andy L Pham
(74) *Attorney, Agent, or Firm*—Rossi, Kimms & McDowell, LLP

(57) ABSTRACT

An image reading apparatus has an original placing portion on which an original is placed, a feed portion for feeding the original placed on the original placing portion to convey the original from one end side of an original plate onto the original plate, a conveying rotary member for conveying the original on the original plate, a reversing and conveying portion for reversing the front side and back side of the original conveyed to the other end side of the original plate by the conveying rotary member, and conveying the reversed original from the other end side onto the original plate, an image reading unit for reading the image of the original stopped on the original plate while being moved, and a control portion for controlling the driving of the conveying rotary member. The control portion controls the conveying rotary member so as to stop the original conveyed from the one end side by the feed portion at a first reading position on the original plate, and stop the original conveyed from the other end side by the reversing and conveying portion at a second reading position on the original plate differing from the first reading position.

9 Claims, 9 Drawing Sheets

IMAGE READING APPARATUS AND IMAGE FORMING APPARATUS PROVIDED WITH THE SAME

BACKGROUND OF THE INVENTION

1. Field of the Invention

The invention relates to an image reading apparatus and an image forming apparatus provided with the same.

2. Related Background Art

For example, a copying machine which is an example of an image forming apparatus is provided with an image reading apparatus for reading the image of an original. The image reading apparatus is provided with image reading means for reading the image of an original, and an automatic original feeding apparatus for conveying the original to be read to a predetermined reading position.

When in such an image reading apparatus, the image of an original is to be read, the original is placed on the original placing portion of the automatic original feeding apparatus, and thereafter the original is conveyed onto an original plate. After the original has been conveyed onto the original plate, the image of the original is read by the image reading means (see Japanese Patent Application Laid-Open No. 2002-049188 and Japanese Patent Application Laid-Open No. 2003-046728.)

FIG. 6 of the accompanying drawings shows an example of such a conventional image reading apparatus. In FIG. 6, the letter A designates an image reading portion, and the letter B denotes an automatic original feeding apparatus. The automatic original feeding apparatus B is mounted so as to cover the upper surface of an original plate 101 provided on the image reading portion A.

The automatic original feeding apparatus B has an original placing portion U101 in which an original placing portion 102 is provided, and an original feeding portion U102 for separating and feeding originals from a bundle of originals G placed on the original placing portion 102 one by one. The automatic original feeding apparatus B further has an original conveying portion U103 provided with a conveying belt 104 passed over a drive roller 105 and a driven roller 106 and also, pressed against the original plate 101 by belt pressing runners 107a-107d. The automatic original feeding apparatus B is provided with an original reversing and discharging portion U104 for reversing and discharging the original G after read.

Also, the image reading portion A has a fluorescent lamp 115 as illuminating means for illuminating the original on the original plate 101. The image reading portion A has a reflector 116 for conveying illuminating light emitted from the fluorescent lamp 115 onto the surface of the original. The image reading portion A has a first mirror 117 for turning back the reflected light from the original. A first scanning optical portion 113 provided in the image reading portion A has the fluorescent lamp 115, the reflector 116 and the first mirror 117. The image reading portion A has a second scanning optical portion 114 provided with a second mirror 118 and a third mirror 119 for turning back the light from the first mirror 117. The image reading portion A is provided with a lens 120 through which the light from the second scanning optical portion 114 passes, and a CCD sensor (image reading element) 121 on which the light having passed through the lens 120 is incident and which photoelectrically converts the image information of the original.

Here, the first scanning optical portion 113 and the second scanning optical portion 114 constituting an image reading unit are guided by a rail member (not shown) and are held for movement in the image reading portion A in the direction indicated by the arrow D or the direction indicated by the arrow J. Design is made such that when the original G is placed with the original reference C of an image reading position on the original plate 101 as the reference, the first and second scanning optical portions 113 and 114 are moved and scan in the direction indicated by the arrow D to thereby read the image of the original. The second scanning optical portion 114 is moved in synchronism with the first scanning optical portion 113 so that during scanning the optical path length may be constant.

Description will now be made of the original image reading operation of the image reading apparatus constructed as described above.

When the image of an original is to be read, the uppermost one of the originals G placed on the original placing portion 102 is separated and conveyed by the original feeding portion U102. Then, the thus separated and conveyed uppermost original G is directed to a pair of registration rollers 103a and 103b. The original directed to the pair of registration rollers 103a and 103b has its skew feed corrected by the pair of registration rollers 103a and 103b, and thereafter is conveyed to the original conveying portion U103. After conveyed to the original conveying portion U103, the original goes into between the conveying belt 104 pressed against the original plate 101 and the original plate 101.

When the original G goes onto the original plate 101, the conveying belt 104 is rotated. By the conveying belt 104 being rotated, the original G is conveyed in the direction indicated by the arrow D on the original plate 101 by the frictional force of the conveying belt 104. Thereafter, when the upstream side edge (hereinafter referred to as the trailing edge) H of the original G conveyed by the conveying belt 104 with respect to the conveying direction of the original arrives at the original reference C of the image reading position on the original plate 101, the conveying belt 104 is stopped, and the original G is stopped. This original reference C of the image reading position is generally located on the left side (original feeding portion side) of the original plate 101.

Next, when the original G is thus stopped, the first and second scanning optical portions 113 and 114 are moved and scan in the direction indicated by the arrow D, and during this movement and scanning, the light from the fluorescent lamp 115 is applied to the original. Thereafter, the reflected light from the original is conveyed by the lens 120 via the first to third mirrors 117, 118 and 119, and is imaged on the CCD sensor 121. Thereby, the image of the original is read.

Next, after the termination of such original image reading, the conveying belt 104 is again rotated, whereby the original G is conveyed in the direction indicated by the arrow D, and is introduced into the original reversing and discharging portion U104 via a right jump bed 108 fixed to the right end of the original plate 101.

Here, when a one-side reading mode is set as a reading mode, the original G is reversed by the original reversing and discharging portion U104, and is again conveyed onto the original plate 101. At this time, the original G assumes a state in which the front side thereof faces upwardly.

Thereafter, the original G is discharged onto an original discharging stand 110 by the original reversing and discharging portion U104.

The discharged original G has its front side facing downwardly. By the original G being discharged with its front side facing downwardly, when the originals G are continuously discharged, the discharged originals G are stacked in the order of pages.

On the other hand, when a two-side reading mode is set as the reading mode, the original G is conveyed to the original plate 101 with its unread back side facing downwardly, by the original reversing and discharging portion U104.

Next, the original G is conveyed in the direction indicated by the arrow J by the conveying belt 104. Via a left jump bed 111 fixed to the left end of the original plate 101, as shown in FIG. 9, the original G is conveyed to an ante-register sensor 112 provided in the original feeding portion U102 by the pair of registration rollers 103a and 103b. Thereafter, when the downstream side end (hereinafter referred to as the leading edge) N of the original G opposite to the trailing edge H with respect to the conveying direction passes between a light emitting portion 112a and a light receiving portion 112b constituting the ante-register sensor 112, the conveying belt 104 and the pair of registration 10, rollers 103a and 103b are reversely rotated to thereby convey the original G in the direction indicated by the arrow D.

When the original G is thus conveyed in the direction indicated by the arrow D, the leading edge N thereof is again detected by the ante-register sensor 112. If design is made such that as described above, the original G is conveyed by a predetermined amount from a point of time at which the leading edge N has been detected, the original G can be stopped at the original reference C of the image reading position. Even if the size of the original G is changed, the amount of conveyance from the point of time at which the ante-register sensor 112 has detected the leading edge N to the original reference C of the image reading position is constant. Accordingly, it never happens that depending on the size of the original, the original stop position becomes uneven. This is also the same control in the case of the front side of the original already described.

Next, as in the case of the front side, the first and second scanning optical portions 113 and 114 are moved and scan in the direction indicated by the arrow D, whereby the image on the back side is read. Thereafter, the original G of which the images have been read is again introduced into the original reversing and discharging portion U104.

Then, the original G is discharged to the original discharging stand 110 by the original reversing and discharging portion U104. At this time, the discharged original G has its front side facing downwardly, and as in the case of the one-side reading mode, the originals G continuously discharged are stacked in the order of pages.

Now, in the case of the one-side reading mode, the front and second scanning optical portions 113 and 114 are moved in the direction indicated by the arrow J and returned to a standby position shown in FIG. 6 after the reading of the image of the original, and thereafter stand by until the next original is placed with the original reference C of the image reading position as the reference.

Also, in the case of the two-side reading mode, the first and second scanning optical portions 113 and 114 read the image on the front side of the original, and thereafter are first moved in the direction indicated by the arrow J and returned to the standby position shown in FIG. 6. Next, the original is reversed by the original reversing and discharging portion U104, and in order to read the image on the back side of the original G placed at the original reference C of the image reading position with its back side facing downwardly, the first and second scanning optical portions 113 and 114 are moved in the direction indicated by the arrow D, and thereafter are moved in the direction indicated by the arrow J and returned to the standby position.

However, in such a conventional image reading apparatus and a copying machine (image forming apparatus) provided with the same, when images on the front side and back side of an original are to be read, the image on the front side is first read at the image reading position, whereafter the original is conveyed to the original reversing and discharging portion. Next, the front side and back side of the original are reversed in the original reversing and discharging portion and the original is returned to the original plate, and thereafter is conveyed from the right end to the left end of the original plate and is returned to the original feeding portion. Thereafter, the original is again conveyed to the same image reading position as that for the front side. Therefore, the distance over which the original is conveyed is very long, thus causing a reduction in productivity.

Japanese Patent Application Laid-Open No. 2003-046728 discloses a construction in which the direction of movement of a scanner is made opposite when an original before reversal is read and when the original after reversal is read. However, in the construction of Japanese Patent Application Laid-Open No. 2003-046728, the position at which the original is stopped when the original before reversal is read and the position at which the original is stopped when the original after reversal is read are the same. Japanese Patent Application Laid-Open No. 2003-046728 bears no detailed description of the conveyance and stoppage of the original.

SUMMARY OF THE INVENTION

So, the present invention has been made in view of such circumstances and has as its object to provide an image reading apparatus which can raise productivity, and an image forming apparatus provided with the same.

The image reading apparatus of the present invention has an original placing portion on which an original is placed, a feed portion for feeding the original placed on the original placing portion to convey the original from one end side of an original plate onto the original plate, a conveying rotary member for conveying the original on the original plate, a reversing and conveying portion for reversing the front side and back side of the original conveyed to the other end side of the original plate by the conveying rotary member, and conveying the reversed original from the other end side onto the original plate, an image reading unit for reading the image of the original stopped on the original plate while being moved, and a control portion for controlling the driving of the conveying rotary member, wherein the control portion controls the conveying rotary member so as to stop the original conveyed from one end side by the feed portion at a first image reading position on the original plate, and stop the original conveyed from the other end side by the reversing and conveying portion at a second image reading position on the original plate differing from the first image reading position, and a first standby position at which the image reading unit stands by to read the original stopped at the first image reading position and a second standby position at which the image reading unit stands by to read the original stopped at the second image reading position are different positions.

Also, the image reading apparatus of the present invention has an original placing portion on which an original is placed, a feed portion for feeding the original placed on the original placing portion to convey the original from one end side of an original plate onto the original plate, a conveying rotary member for conveying the original on the original plate, a reversing and conveying portion for reversing the front side and back side of the original conveyed to the other end side of the original plate by the conveying rotary member, and conveying the reversed original from the other end side onto the original plate, an image reading unit for reading the image of the original stopped on the original plate while being moved, and a control portion for controlling the driving of the conveying rotary member, wherein the control portion controls the conveying rotary member so as to stop the original conveyed from one end side by the feed portion at a first image reading position on the original plate, and stop the original conveyed from the other end side by the reversing and conveying portion at a second image reading position on the original plate differing from the first image reading position.

DESCRIPTION OF THE PREFERRED EMBODIMENTS

The best form for carrying out the present invention will hereinafter be described in detail with reference to the drawings.

Figure 1:
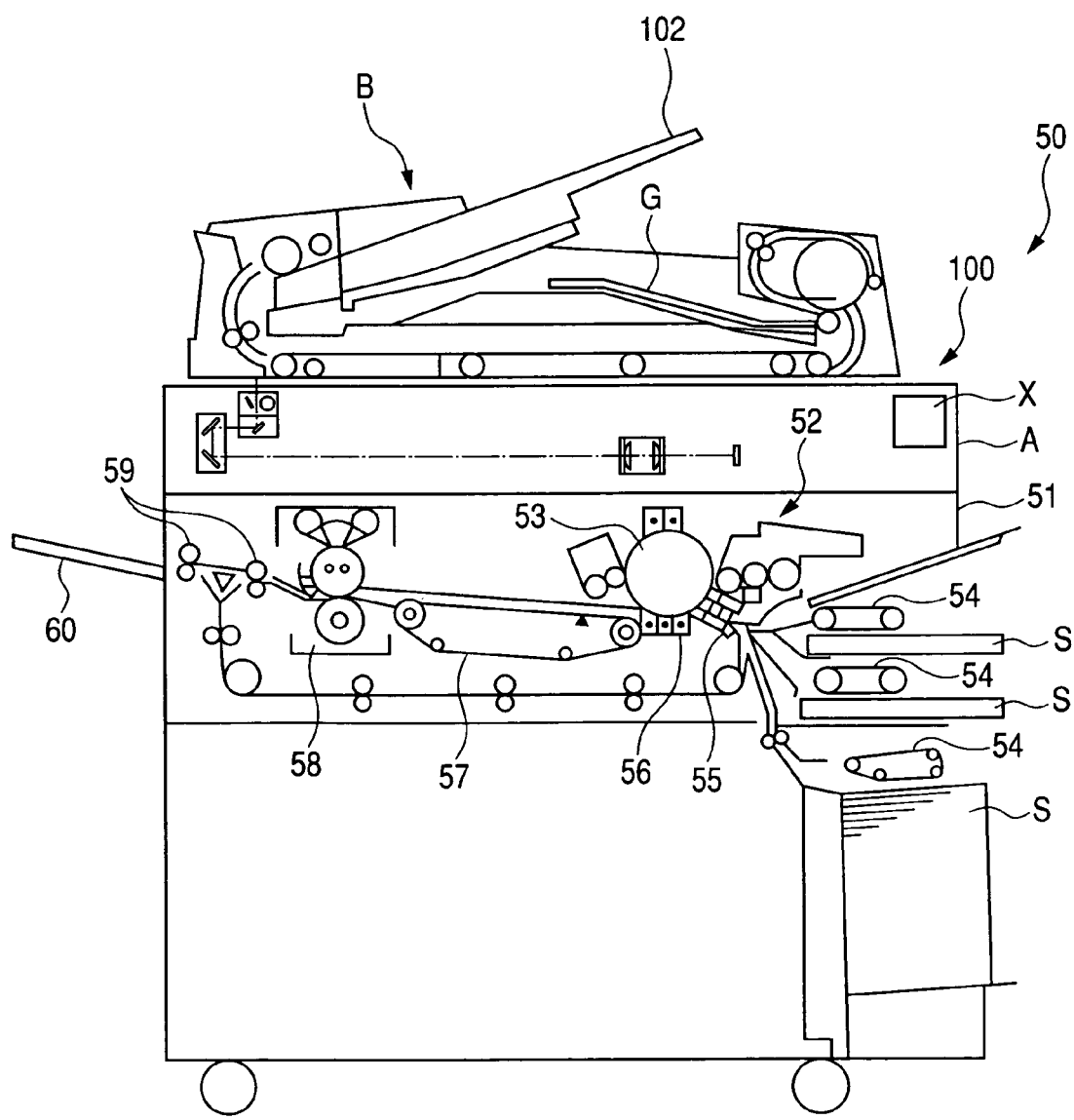
FIG. 1 shows the construction of a digital copying machine which is an example of an image forming apparatus provided with an image reading apparatus according to an embodiment of the present invention.

FIG. 1 shows the construction of a digital copying machine which is an example of an image forming apparatus provided with an image reading apparatus according to an embodiment of the present invention.

In FIG. 1, the reference numeral 50 designates the digital copying machine and the reference numeral 51 denotes a digital copying machine main body (hereinafter referred to as the apparatus main body). In the upper portion of this apparatus main body 51, there is provided an image reading apparatus 100 provided with an automatic original feeding apparatus B and an image reading portion A. In the central portion of the apparatus main body 51, there is provided an image forming portion 52.

In the digital copying machine 50 of such a construction, in case of image formation, a plurality of originals G set on the automatic original feeding apparatus B are first successively fed to a reading position. The fed originals G are read by original reading means which will be described later and also, in accordance with this read information, a toner image is formed on the surface of the photosensitive drum 53 of the image forming portion 52.

Next, in timed relationship with the toner image formation on the surface of the photosensitive drum, a recording medium S fed by a sheet feeding portion 54 is conveyed to between the photosensitive drum 53 and a transfer charger 56 by registration rollers 55. Then, by the application of a bias to the transfer charger 56, the toner image formed on the photosensitive drum 53 is transferred to the recording medium S.

Next, the recording medium S to which the toner image has been transferred is conveyed to a fixing portion 58 by a conveying belt 57. Heat and pressure are applied to the recording medium S by the fixing portion 58, whereby the toner image is fixed on the recording medium S. Lastly, this recording medium S is discharged onto a sheet discharging tray 60 by discharge rollers 59.

Figure 2:
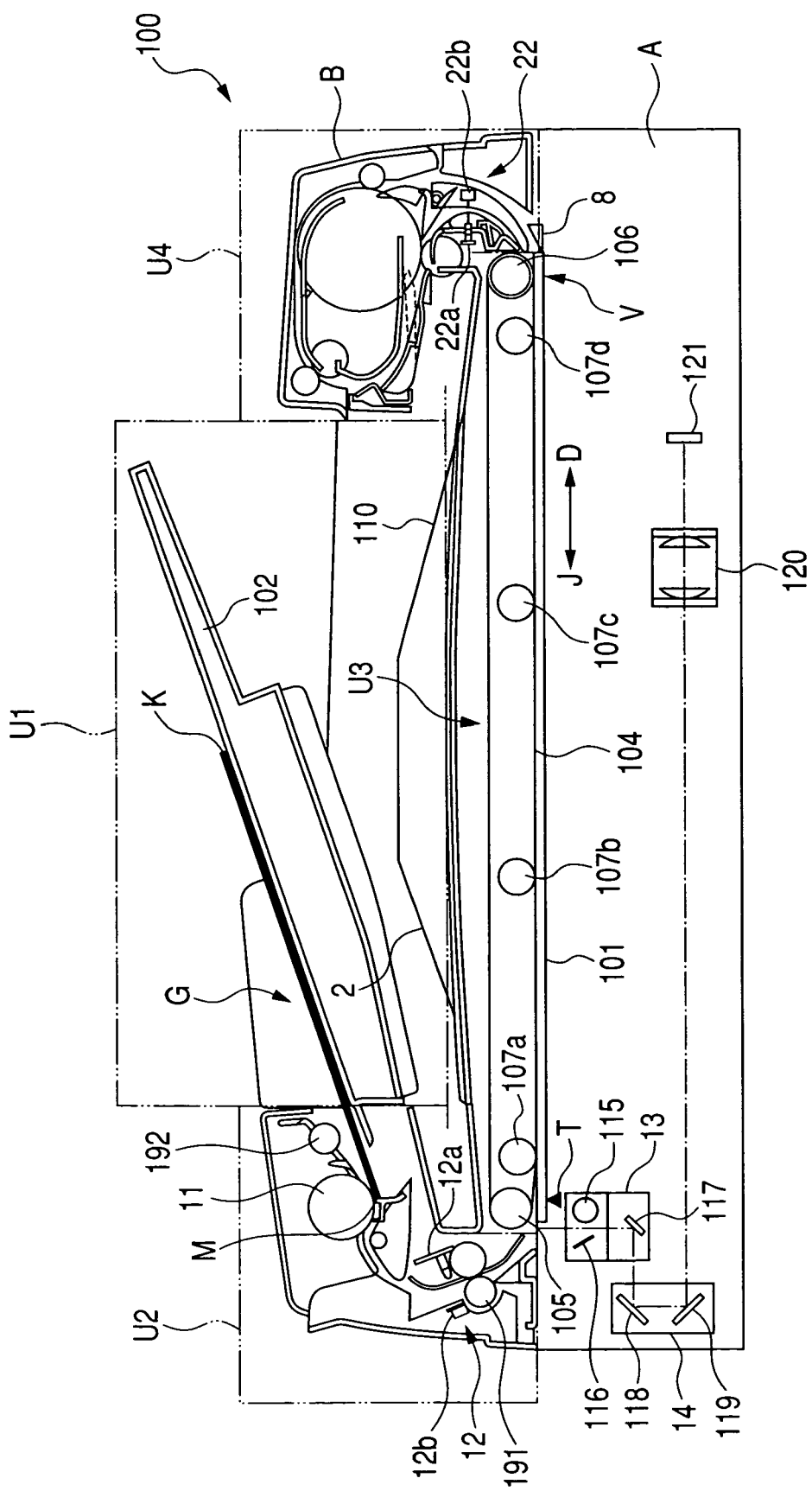
FIG. 2 shows the construction of the image reading apparatus.

FIG. 2 shows the construction of the image reading apparatus 100 according to the present embodiment.

As shown in FIG. 2, the automatic original feeding apparatus B is provided with an original placing portion U1 in which an original placing stand 102 is provided, and an original feeding portion U2 for separating and feeding originals one by one from a bundle of originals G placed on the original placing stand 102, and conveying them to an original plate 101.

The original feeding portion U2 serves to feed the original on the original placing stand 102 from one end side (the left side as viewed in FIG. 2) of the original plate 101 onto the original plate 101. The original feeding portion U2 has a pickup roller 192 for picking up and feeding the originals placed on the original placing stand 102, and a sheet feeding roller 11 for separating and feeding the originals fed by the pickup roller 192 one by one. The original feeding portion U2 further has a pair of registration rollers 191 for conveying the original fed by the sheet feeding roller 11 onto the original plate 101.

The automatic original feeding apparatus B has an original conveying portion U3 for conveying the original on the original plate 101. The original conveying portion U3 is provided with a conveying belt 104 passed over a drive roller 105 and a driven roller 106, and also pressed against the original plate 101 by belt pressing runners 107a-107d. The conveying belt 104 as a conveying rotary-member provided in the original conveying portion U3 conveys the original on the original plate 101 and stops the original at a predetermined position on the original plate 101.

The automatic original feeding apparatus B is further provided with an original reversing and discharging portion (reversing and conveying portion) U4 for reversing and discharging the original G after read. The original reversing and discharging portion U4 reverses the front side and back side of the original conveyed out to the other end side (the right side as viewed in FIG. 2) of the original plate 101 by the conveying belt 104, and again conveys the original from the other end side of the original plate 101 onto the original plate 101. The original reversing and discharging portion U4 can also discharge the original conveyed out to the other end side (the right side as viewed in FIG. 2) of the original plate 101 by the conveying belt 104 onto an original discharging stand 110. The original reversing and discharging portion U4 is provided with a right jump bed 8, a forwardly and reversely rotatable reversing roller 109, an introducing path P1, a reversing path P2, a discharging path P3 and a conveying-out path P4.

A first scanning optical portion 13 provided in the image reading portion A has a fluorescent lamp 115, a reflector 116 and a first mirror 117. The image reading portion A has a second scanning optical portion 14 provided with a second mirror 118 and a third mirror 119 for turning back the light from the first mirror 117. The image reading portion A is further provided with a lens 120 through which the light from the second scanning optical portion 114 passes, and a CCD sensor (image reading element) 121 on which the light having passed through the lens 120 is incident and which photoelectrically converts the image information of the original.

Here, the first scanning optical portion 13 and the second scanning optical portion 14 constituting an image reading unit are guided by a rail member (not shown) and are held for movement in the image reading portion A in the direction indicated by the arrow D or J. When the original G is placed on the original plate 101, the first and second scanning optical portions 13 and 14 are moved and scan in the direction indicated by the arrow D to thereby read the image of the original. The second scanning optical portion 14 is moved in synchronism with the first scanning optical portion 13 so that the optical path length may become constant during the scanning.

A control portion X controls the driving of the original feeding portion U2, the original conveying portion U3 and the original reversing and discharging portion U4. Also, the control portion X controls the operations of the first and second scanning portions 13 and 14.

Figure 6:
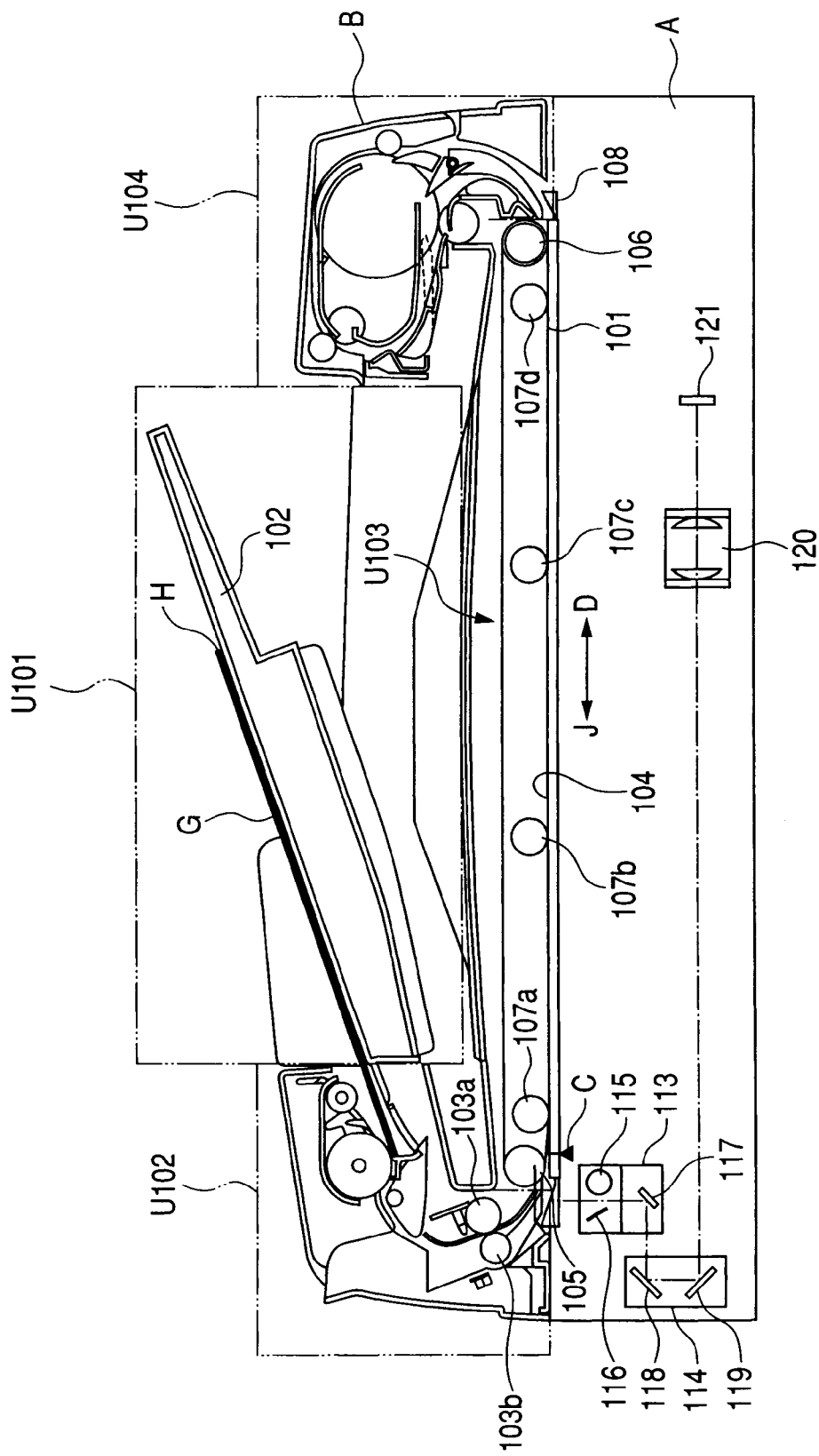
FIG. 6 shows the construction of a conventional image reading apparatus

The functions and action of the first and second scanning optical portions 13 and 14 in the present embodiment are the same as the functions and action of the first and second scanning optical portions 113 and 114 of the conventional image reading apparatus shown in FIG. 6 already described. Consequently, the detailed description of the functions and action of the first and second scanning optical portions 13 and 14 need not be made.

In FIG. 2, the letter T designates the original reference (first reference position) of a first image reading position provided at the left end which is one end of the original plate 101. The reference T of the first image reading position is provided at a distance of 11 mm from the left end of the original plate 101. Also, the letter V denotes the original reference (second reference position) of a second image reading position provided at the right end which is the other end of the original plate 101. The original reference V of the second image reading position is provided at a distance of 11 mm from the right end of the original plate 101.

An ante-register sensor 12 is provided in the original feeding portion U2, and is provided with a light emitting portion 12a and a light receiving portion 12b. The downstream edge of the original G conveyed by the original feeding portion U2 with respect to the conveying direction of the original (hereinafter referred to as the leading edge M of the original) and the upstream edge of the original G with respect to the conveying direction thereof (hereinafter referred to as the trailing edge K of the original) can be detected by the ante-register sensor (feed portion sensor) 12 to thereby detect the length of the original in the conveying direction thereof.

Further, the original G is conveyed by a predetermined amount from a point of time at which the ante-register sensor 12 which is detecting means for detecting the length of the original G in the conveying direction thereof has detected the trailing edge K of the original, whereby the original G can always be stopped with the original reference T of the first image reading position as the reference. That is, on the basis of the output of the ante-register sensor 12, the control portion X controls the rotation of the conveying belt 104 so that the original conveyed by the conveying belt 104 may be stopped with the original reference T of the first image reading position as the reference.

Also, the reference numeral 22 designates a reversing portion sensor provided in the original reversing and discharging portion U4, and provided with a light emitting portion 22a and a light receiving portion 22b. In case of a two-side reading mode which will be described later, the trailing edge K of the original is detected by this reversing portion sensor 22, and the original G is conveyed by a predetermined amount from that point of time, whereby the original G can always be stopped with the original reference V of the second image reading position as the reference. That is, on the basis of the output of the reversing portion sensor 22, the control portion X controls the rotation of the conveying belt 104 so that the original conveyed by the conveying belt 104 may be stopped with the original reference V of the second image reading position as the reference.

Now, during the time when the original is fed by the original feeding portion U2, the first and second scanning optical portions 13 and 14 stand by at a first standby position Q. The first standby position Q is a position corresponding to the original reference T of the first image reading position. Then, when the original G is stopped with the original reference T of the first image reading position as the reference, the first and second scanning optical portions 13 and 14 which are image reading means scan in the direction indicated by the arrow D along the original G being stopped, whereby the front side of the original G is read. In the present embodiment, the movement distance of the first and second scanning optical portions 13 and 14 corresponds to the length L of the original G detected by the ante-register sensor 12.

Further, the first and second scanning optical portions 13 and 14, after they have read the front side of the original G, are not returned to the first standby position Q shown in FIG. 3 which will be described later. The first and second scanning optical portions 13 and 14, after they have read the front side of the original G, are moved to a second standby position R shown in FIG. 4, and stand by at the second standby position R. The second standby position is a position corresponding to a position at the left from the original reference V of the second image reading position by an amount corresponding to the length L of the original G detected by the ante-register sensor 12. That is, the second standby position is a position corresponding to the position of the other end of the original stopped so that one end thereby may coincide with the original reference V of the second image reading position. The first and second scanning optical portions 13 and 14, after they have been moved to the second standby position R, stand by there until the original G is stopped with the original reference V of the second image reading position as the reference.

Then, in the case of the two-side reading mode which will be described later, the original G is reversed by the original reversing and discharging portion U4. The original reversed by the original reversing and discharging portion U4 is stopped when the trailing edge K is conveyed to the original reference V of the second image reading portion. After the original has been stopped at the second image reading position V, the first and second scanning optical portions 13 and 14 scan in the direction indicated by the arrow D along the original G by an amount corresponding to the length L of the original detected by the ante-register sensor 12, whereby the back side of the original G is read. After they have thus read the back side of the original G, the first and second scanning optical portions 13 and 14 are returned to the first standby position Q at the left end to read the front side of the next original.

The operation of the image reading apparatus 100 when reading the image of the original will hereinafter be described in detail.

The uppermost one of the originals G placed on the original placing portion 102 is separated and conveyed by the pickup roller 192 and feed roller 11 of the original feeding portion U2. The thus separated and conveyed uppermost original G is directed to the pair of registration rollers 191. The original directed to the pair of registration rollers 191 has its skew feed corrected by the pair of registration rollers 191, and thereafter is conveyed to the original conveying portion U3. After conveyed to the original conveying portion U3, the original is conveyed between the conveying belt 104 pressed against the original plate 101 and the original plate 101.

When the original. G goes onto the original plate 101, the conveying belt 104 is rotated. By the conveying belt 104 being rotated, the original G is conveyed in the direction indicated by the arrow D on the original plate 101 by the frictional force of the conveying belt 104. Thereafter, the upstream side edge (hereinafter referred to as the trailing edge) K of the original G conveyed by the conveying belt 104 with respect to the conveying direction arrives at the original reference T of the first image reading position of the original plate 101, whereupon the conveying belt 104 is stopped and the original G is stopped. That is, the control portion X controls the rotation of the conveying belt 104 so that the original may be stopped at a position whereat the trailing edge portion of the original coincides with the original reference T of the first image reading position.

Next, when the original G is thus stopped at the first image reading position, the first and second scanning optical portions 13 and 14 are moved and scan in the direction indicated by the arrow D, and during this movement and scanning, the light from the fluorescent lamp 115 is applied to the original. The reflected light from the original is conveyed by the lens 120 via the first to third mirrors 117, 118 and 119, and is imaged on the CCD sensor 121. Thereby, the image of the original is read.

Next, after the termination of such reading of the image of the original, the conveying belt 104 is rotated again, whereby the original G is conveyed in the direction indicated by the arrow D, and is introduced into the original reversing and discharging portion U4 via the right jump bed 8 fixed to the right end of the original plate 101.

Figure 7A:
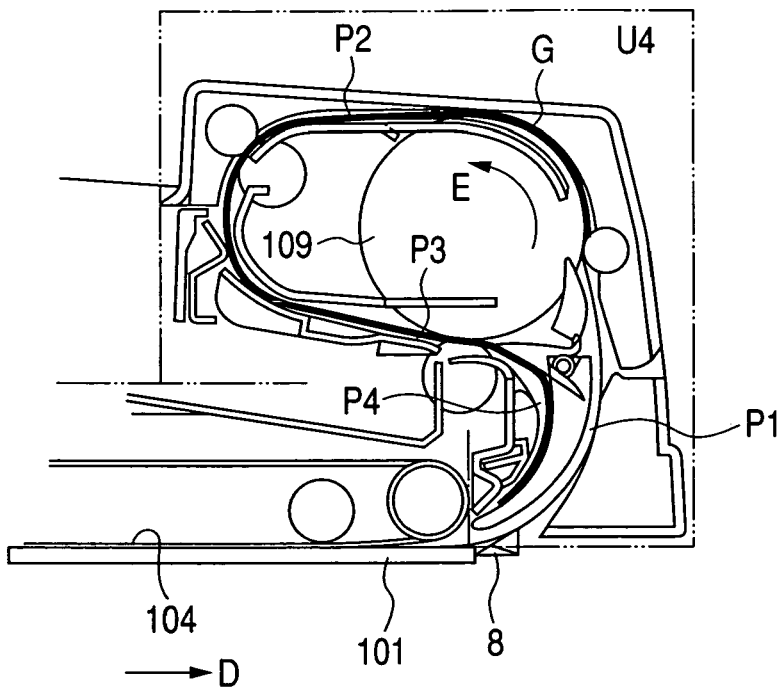
FIGS. 7A and 7B are first views illustrating the sheet reversing and discharging operation of the sheet reversing and discharging portion of an automatic original feeding apparatus provided in an image reading apparatus according to an embodiment of the present invention.

In a case where a one-side reading mode is set as the reading mode, the original G is fed into the introducing path P1 of the original reversing and discharging portion U4, as shown in FIG. 7A. After fed into the introducing path P1, the original is fed into the discharging path P3 through the reversing path P2 by the forward rotation driving of the reversing roller 109 in the direction indicated by the arrow E, and is further fed into the conveying path P4.

Figure 7B:
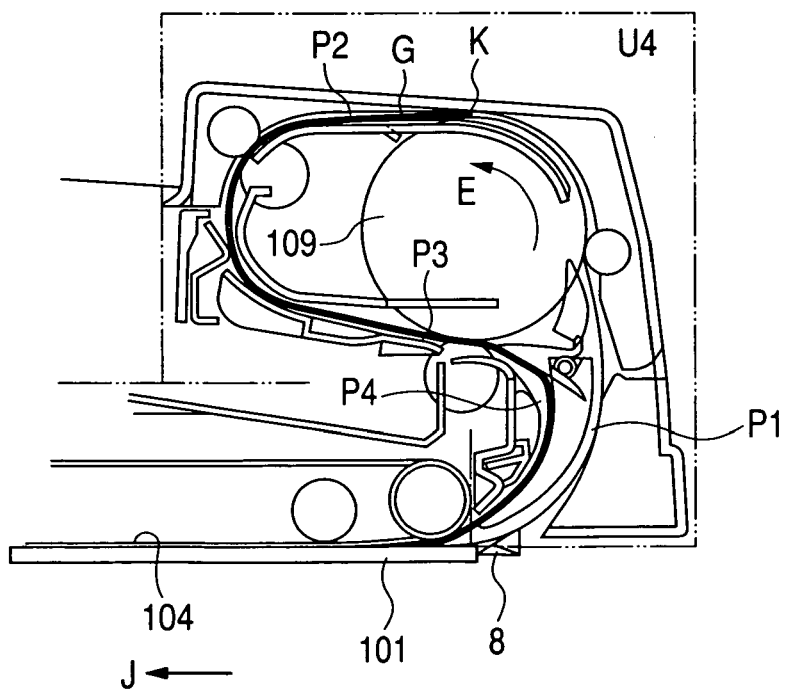

After the original G has been fed into the conveying path P4, the conveying belt 104 is reversely driven in the direction indicated by the arrow J. By the conveying belt 104 being reversely driven, the original G is again conveyed onto the original plate 101, as shown in FIG. 7B, whereupon the reversing roller 109 is stopped. At this time, the original G assumes a state in which the front side thereof faces upwardly.

Figure 8A:
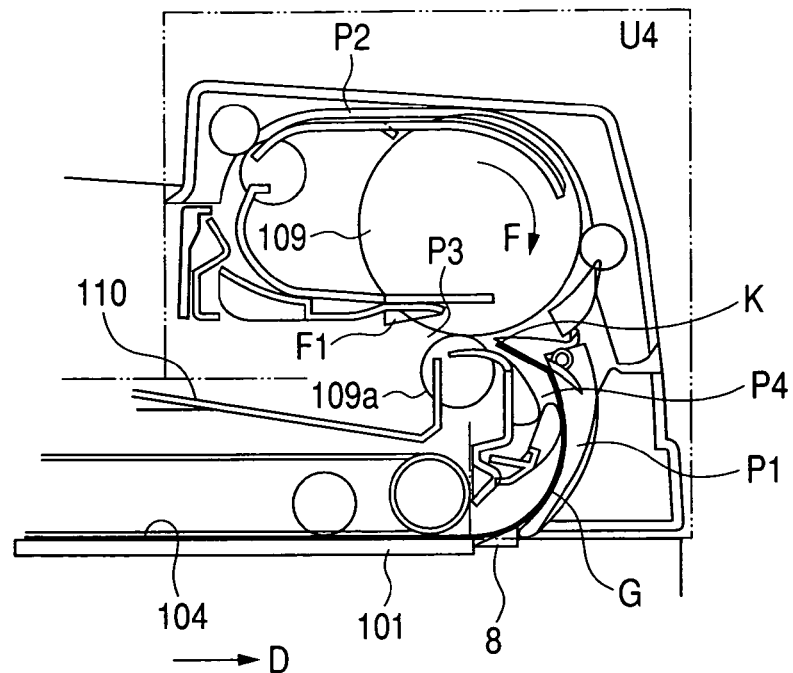
FIGS. 8A and 8B are second views illustrating the sheet reversing and discharging operation of the sheet reversing and discharging portion of the automatic original feeding apparatus provided in the image reading apparatus according to the embodiment of the present invention.
Figure 8B:
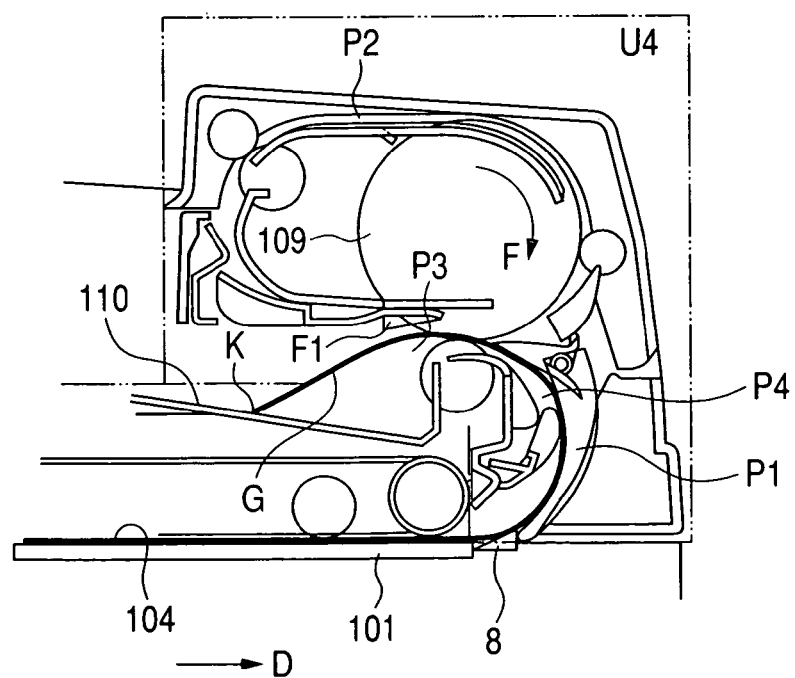
Figure 9:
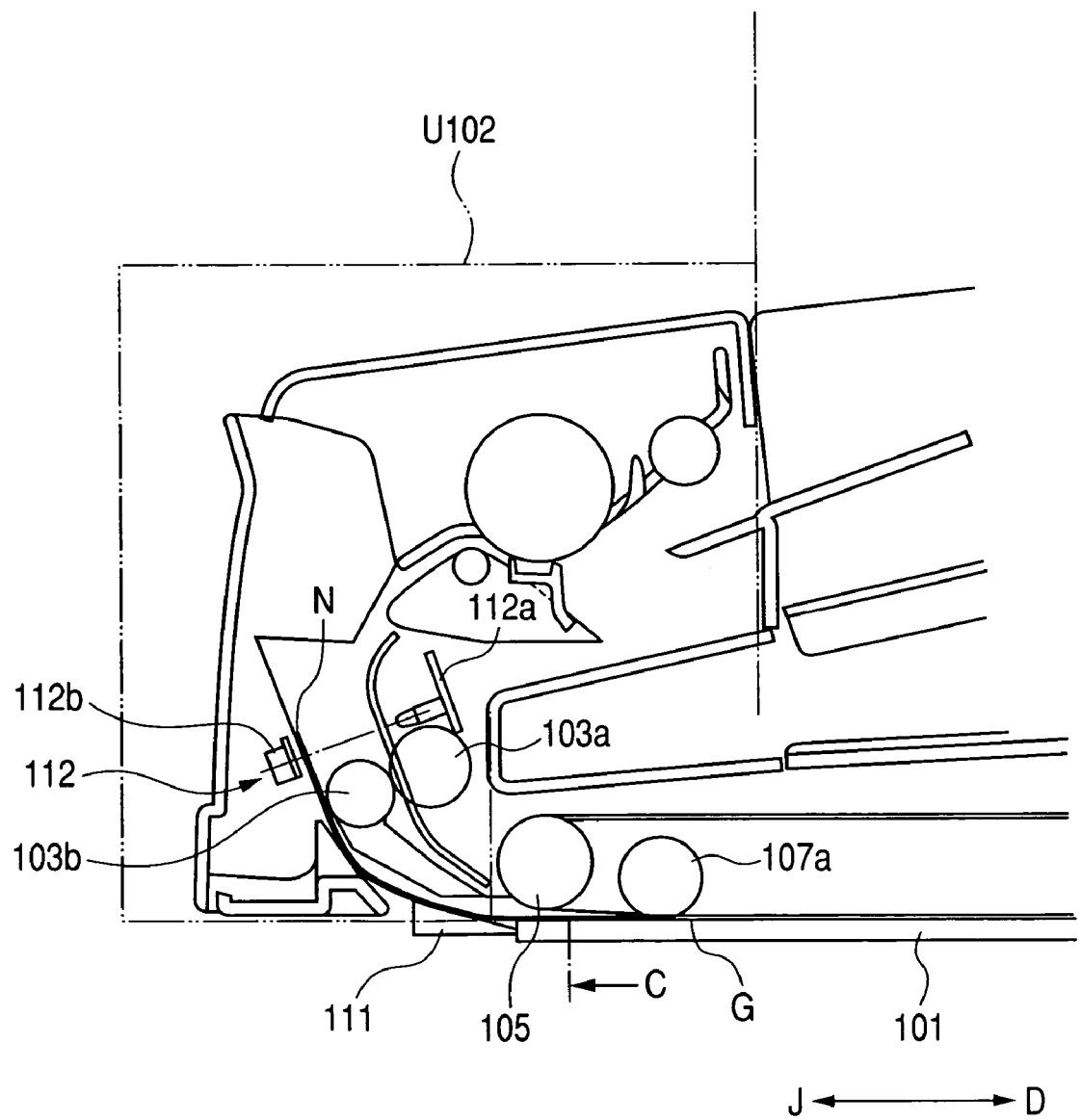
FIG. 9 shows the construction of an original feeding portion provided in the conventional image reading apparatus.

Next, as shown in FIG. 8A, the trailing edge K of the original G passes through the nip portion between the reversing roller 109 and the reversing runner 109a. Thereafter, at predetermined timing, the reversing roller 109 is reversely driven in the direction indicated by the arrow F and also, a flapper F1 is upwardly pivotally moved and the conveying belt 104 is forwardly driven in the direction indicated by the arrow D to thereby switch back the original G to the conveying path P4. Thereby, as shown in FIG. 8B, the original G is discharged onto the original discharging stand 110 through the discharging path P3.

At this time, the discharged original G has its front side facing downwardly, and when originals G are continuously discharged with their front sides thus facing downwardly, the discharged originals are stacked in the order of pages.

Description will now be made of the image reading operation of the image reading apparatus 100 of such a construction in the two-side reading mode.

As shown in FIG. 2, the original G placed on the original placing stand 102 of the original placing portion U1 is conveyed onto the original plate 101 with its front side facing downwardly by the original feeding portion U2. Here, when the size of the original G is e.g. A4, the control portion X detects by original length information from the ante-register sensor 12 that the length L of the original G in the conveying direction is 210 mm. Thereafter, the control portion X controls the rotation of the conveying belt 104 so as to rotate the conveying belt 104, and convey the original G by a predetermined amount from a point of time at which the trailing edge K of the original has been detected, and then stop the original G. By this operation, the original G is stopped with the original reference T of the first image reading position as the reference.

Figure 3:
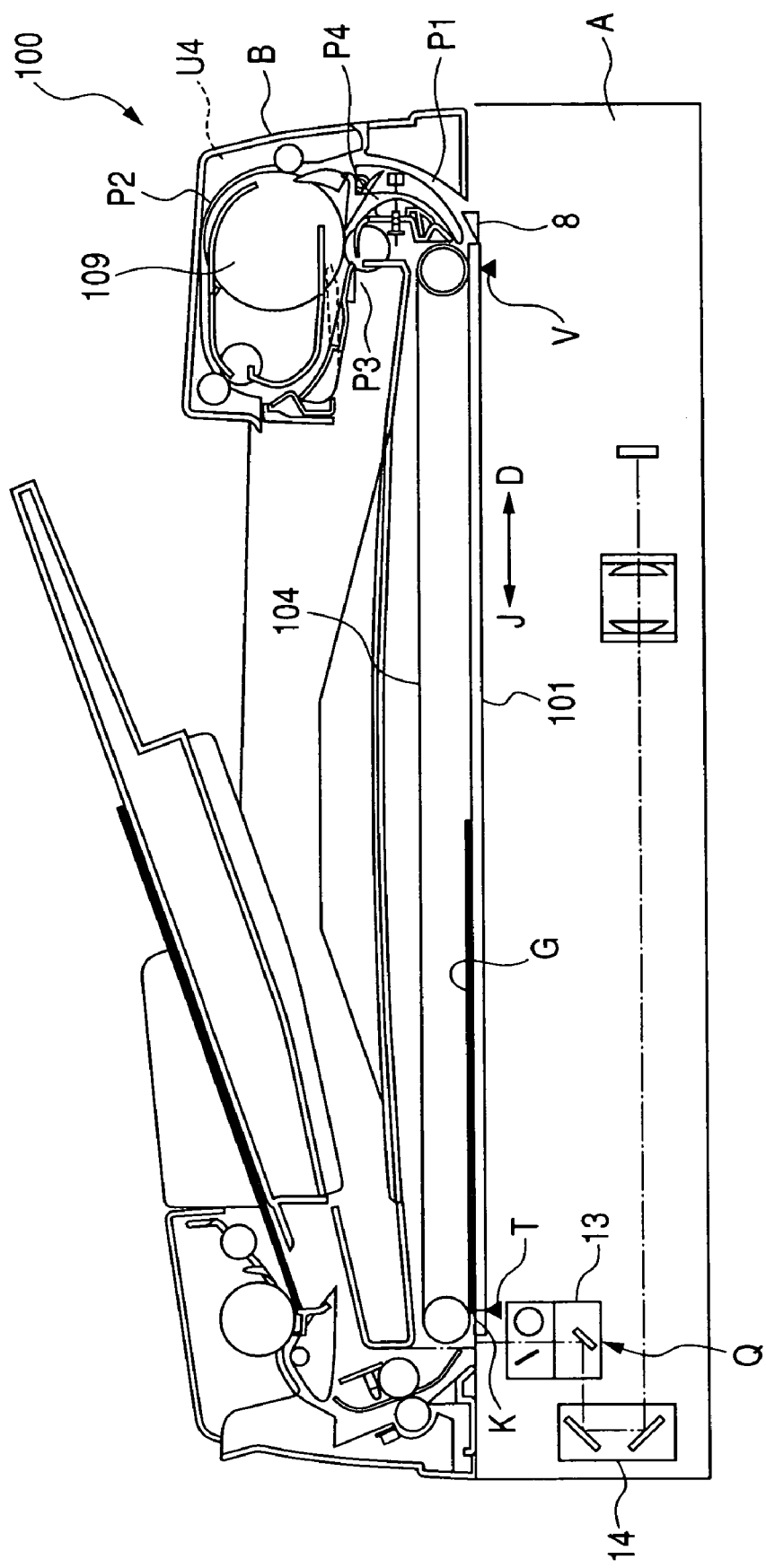
FIG. 3 is a first view illustrating the image reading operation of the image reading apparatus.
Figure 4:
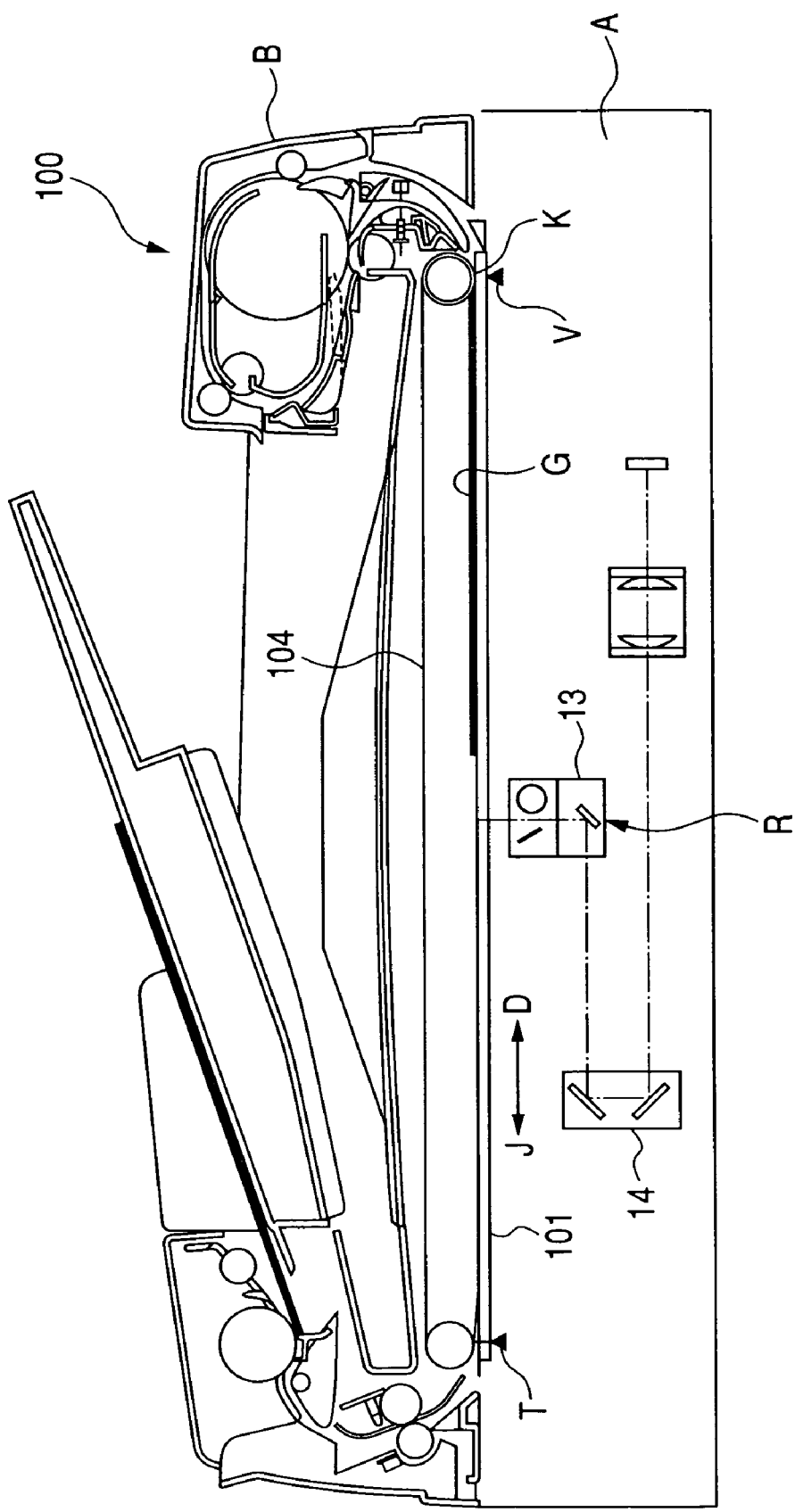
FIG. 4 is a second view illustrating the image reading operation of the image reading apparatus.

The first and second scanning optical portions 13 and 14, as shown in FIG. 3, stand by at the first standby position Q at the left end until the original is stopped. The first standby position Q is the standby position of the first and second scanning optical portions 13 and 14 for reading the image of the original stopped at the first image reading position. The first standby position Q is a position corresponding to the original reference T of the first image reading position.

When the original G of which the trailing edge K has been conveyed to the original reference T of the first image reading position is then stopped, the first and second scanning optical portions 13 and 14 scan in the direction indicated by the arrow D along the original G by an amount corresponding to the length L (=210 mm) of the original G detected by the ante-register sensor 12. Thereby, the front side of the original G is read.

In the present embodiment, the first standby position Q of the first and second scanning optical portions 13 and 14 is a position deviated by a predetermined amount in the direction J opposite to the scanning direction of the first and second scanning optical portions 13 and 14 relative to the original reference T of the first image reading position. Consequently, the original reading operation is performed during the time when the first and second scanning optical portions 13 and 14 start the reading operation after moved by the predetermined amount, and the first and second scanning optical portions 13 and 14 are further moved by an amount corresponding to the length L of the original.

The first standby position Q of the first and second scanning optical portions 13 and 14 and the original reference of the first image reading position may be made coincident with each other.

Next, after the termination of such reading of the front side of the original, the conveying belt 104 is rotated again, whereby the original G is conveyed in the direction indicated by the arrow D. The original is introduced into the original reversing and discharging portion U4 via the right jump bed 8 fixed to the right end of the original plate 101.

In this original reversing and discharging portion U4, the original is passed through the introducing path P1, the reversing path P2, the discharging path P3 and the conveying path P4 in the named order, and the original G is again conveyed to the original plate 101 with its unread side facing downwardly. At this time, the control portion X conveys the original G by a predetermined amount from a point of time at which the trailing edge K of the original has been detected by the reversing portion sensor 22, and then stops the original. Thereby, the original G is stopped with the original reference V of the second image reading position as the reference.

Now, the first and second scanning optical portions 13 and 14 are not returned to the first standby position Q after they have read the front side of the original. After they have read the front side of the original, the first and second scanning optical portions 13 and 14 are moved to the second standby portion R shown in FIG. 4, and at the second standby position R they stand by until the original G of which the front side and back side have been reversed is again stopped on the original plate 101. The second standby position R is a position corresponding to a position at the left from the original reference V of the second image reading position by an amount corresponding to the length L (=210 mm) of the original detected by the ante-register sensor 12.

When, the trailing edge K of the original G is conveyed to the original reference V of the second image reading position and the original G is stopped, whereupon the first and second scanning optical portions 13 and 14 scan in the direction indicated by the arrow D along the original G by an amount corresponding to the length L (=210 mm) of the original. Thereby, the back side of the original G is read.

In the present embodiment, the second standby position R of the first and second scanning optical portions 13 and 14 is a position deviated by a predetermined amount in the direction indicated by the arrow J opposite to the scanning direction of the first and second scanning optical portions 13 and 14 further from a position at the left by the length L of the original from the original reference V of the second image reading position. Consequently, the reading operation is started after the first and second scanning optical portions 13 and 14 have been moved by the predetermined amount, and the original reading operation is performed during the time when the first and second scanning optical portions 13 and 14 are being further moved by an amount corresponding to the length L of the original.

The second standby position R of the first and second scanning optical portions 13 and 14 and the position at the left by the length L of the original from the original reference V of the second image reading position may be made coincident with each other.

Next, after the termination of such reading of the image of the back side of the original G, the conveying belt 104 is rotated again, whereby the original G is conveyed in the direction indicated by the arrow D. The original is again introduced into the original reversing and discharging portion U4 via the right jump bed 8. Then, the original is discharged onto the original discharging stand 10 by the original reversing and discharging portion U4. That is, the original G fed into the introducing path P1 of the original reversing and discharging portion U4 passes through the discharging path P3 by the driving of the reversing roller 109 in the direction indicated by the arrow F indicated in FIG. 8A, and is discharged onto the original discharging stand 110, as shown in FIG. 8B. Also, the first and second scanning optical portions 13 and 14 are returned to the first standby position Q at the left end shown in FIG. 3 to read the front side of the next original.

When the size of the original is other size, e.g. B4, the length L of the original G is detected to be 364 mm by the ante-register sensor 12. Thereby, as already described, the trailing edge K of the original G is conveyed to the original reference T of the first image reading position and the original G is stopped. The first and second scanning optical portions 13 and 14 scan in the direction indicated by the arrow D along the original G by an amount corresponding to the detected length L (=364 mm) of the original, whereby the front surface of the original G is read.

Figure 5:
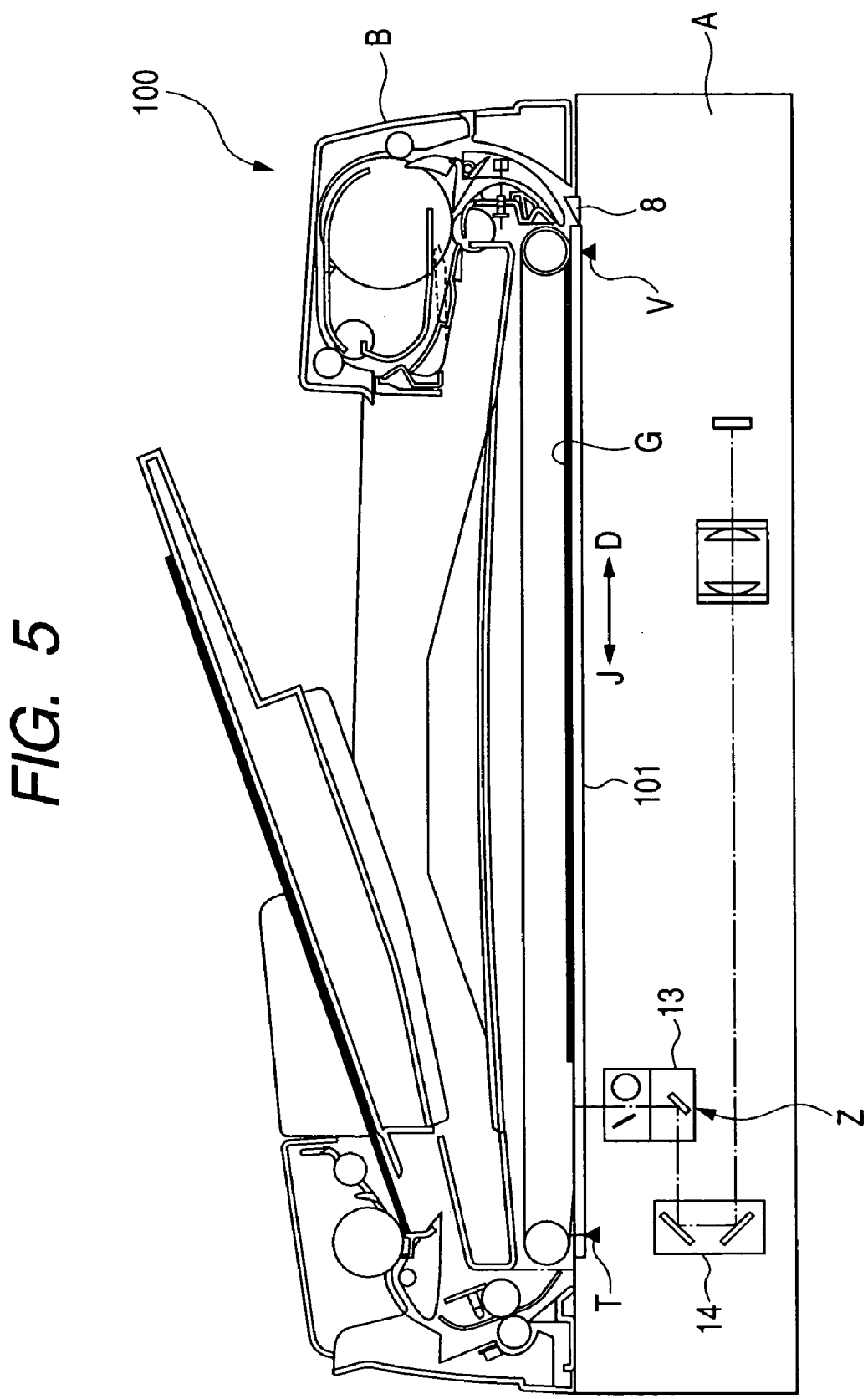
FIG. 5 is a third view illustrating the image reading operation of the image reading apparatus.

Again in a case where the length L of the original G is 364 mm, the first and second scanning optical portions 13 and 14 are not returned to the first standby position after they have read the front side of the original G. The first and second scanning optical portions 13 and 14 are moved to a standby position Z shown in FIG. 5 corresponding to a position at the left from the original reference V of the second image reading position by an amount corresponding to the detected length L (=364 mm) of the original. After the front side and back side of the original have been reversed by the original have been reversed by the original reversing and discharging portion U4, the first and second scanning optical portions 13 and 14 stand by at the standby position Z until the original G is stopped with the original reference V of the second image reading position as the reference.

Then, the trailing edge K of the original G is conveyed to the original reference V of the second image reading position, and the original G is stopped, whereupon the first and second scanning optical portions 13 and 14 scan in the direction indicated by the arrow D by an amount corresponding to the length L (=364 mm) of the original. Thereby, the back side of the original G is read.

Next, after the termination of such reading of the back side of the original, the conveying belt 104 is rotated again. By the rotation of the conveying belt 104, the original G is conveyed in the direction indicated by the arrow D, and is introduced into the original reversing and discharging portion U4 again via the right jump bed 8, and is discharged onto the original discharging stand 10 by the original reversing and discharging portion U4. Also, the first and second scanning optical portions 13 and 14 are returned to the first standby position Q at the left end shown in FIG. 3 to read the front side of the next original.

When the image of the back side of the original G is to be read as in the present embodiment, the standby position of the first and second scanning optical portions 13 and 14 are not on the left end side, but on the original reference V side of the second image reading position. When the back side is to be read, it never happens that the first and second scanning optical portions scan from the left end to the right end of the original plate 101, and are moved from the right end to the left end to return to the standby position at the left end. Thereby, the distance by which the first and second scanning optical portions 13 and 14 can be shortened.

In other words, the standby position of the first and second scanning optical portions 13 and 14 when they read the original G stopped with the original reference V of the second image reading position as the reference is made more adjacent to the second image reading position than the standby position when they read the original G stopped with the original reference T of the first image reading position as the reference. Accordingly, it is possible to shorten the movement distance of the first and second scanning optical portions 13 and 14 when they read the image of the original stopped at the second image reading position. That is, after the first and second scanning optical portions 13 and 14 have read the front side of the original, the distance by which they are moved to read the back side of the original becomes shorter. Accordingly, the time until the image reading operation is started becomes shorter, and productivity can be raised.

In the foregoing description, it has been described that the second standby position of the first and second scanning optical portions 13 and 14 when they read the original G stopped at the second image reading position is adjacent to the first image reading position by a distance corresponding to the length of the original from the original reference V of the second image reading position. However, if the second standby position is made more adjacent to the second image reading position than the standby position of the first and second scanning optical portions 13 and 14 when they read the original G stopped at the first image reading position, the time until the image reading operation is started will become shorter, and productivity can be raised.

In the present embodiment, design is made such that as already described, the standby position of the image reading means when reading the original stopped at the second original reading position is more adjacent to the second original reading position than the standby position when the image reading means reads the original stopped at the first original reading position. Accordingly, it is possible to shorten the movement distance from the standby position of the image reading means when reading the image of the original stopped at the second original reading position, whereby the time until the image reading operation is started becomes shorter, and productivity can be raised.

In the above-described embodiment, as the detecting means for detecting the length of the original, there has been shown by way of example a construction in which the leading edge and trailing edge of the original being conveyed are detected by the ante-register sensor 12 to thereby detect the length of the original in the conveying direction thereof. However, provision may be made of a sensor for detecting the originals stacked on the original placing stand 102, and the length of the original may be detected by this sensor. In this case, for example, a plurality of sensors for detecting the sensor are provided in the conveying direction on the original placing stand 102 so that on the basis of outputs from the plurality of sensors, the control portion X may judge the length of the original. Also, there may be constructed detecting means for detecting the length of the original by such a form that a user inputs the length of the original to an operating portion or the like, and the control portion X recognizes the length of the original on the basis of the length of the original in the conveying direction inputted by the user.

This application claims priority from Japanese Patent Application Nos. 2004-281401 filed on Sep. 28, 2004 and 2004-290774 filed on Oct. 1, 2004, which are hereby incorporated by reference herein.

What is claimed is:

1. An image reading apparatus comprising:
an original placing portion on which an original is placed;
a feed portion for feeding the original placed on said original placing portion to convey the original from one end side of an original plate onto said original plate;
a conveying rotary member for conveying the original on said original plate;
a reversing and conveying portion for reversing a front side and a back side of the original conveyed to the other end side of said original plate by said conveying rotary member and conveying the reversed original from the other end side onto said original plate;
an image reading unit for reading an image of the original stopped on said original plate while being moved; and
a control portion for controlling a driving of said conveying rotary member and a movement of said image reading unit,
wherein said control portion controls said conveying rotary member so as to stop the original conveyed from the one end side by said feed portion at a first image reading position set on the one end side of said original plate, and stop the original conveyed from the other end side by said reversing and conveying portion at a second image reading position set on the other end side of said original plate differing from said first image reading position,
wherein said control portion controls the movement of said image reading unit so that said image reading unit stops at a first standby position while said feed portion feeds the original to said first image reading position, and after said image reading unit reads the original stopped at said first image reading position, said control portion controls the movement of said image reading unit so that said image reading unit moves to a second standby position differing from the first standby position, and while said image reading unit is stopped at the second standby position, said reversing and conveying portion conveys the original to said second image reading position, and
wherein said first image reading position is a position at which an edge of the original stopped at said first image reading position aligns with a first reference position provided on the one end side of said original plate, and said second image reading position is a position at which the edge of the original stopped at said second image reading position aligns with a second reference position provided on the other end side of said original plate.

2. An image reading apparatus according to claim 1, wherein said first standby position of said image reading unit is a position on the one end side of said original plate, and said second standby position of said image reading unit is a position on the other end side of said original plate.

3. An image reading apparatus according to claim 1, further comprising detecting means for detecting a length of the original in the conveying direction of the original, wherein said second standby position of said image reading unit when reading the original stopped at said second image reading position is changed in accordance with the length of the original detected by said detecting means.

4. An image reading apparatus according to claim 1, wherein said first standby position of said image reading unit substantially aligns with an edge of the original stopped at said first image reading position, and said second standby position of said image reading unit substantially aligns with an edge of the original stopped at said second image reading position.

5. An image reading apparatus according to claim 1, wherein said first standby position of said image reading unit is a position corresponding to said first reference position, and said second standby position of said image reading unit is a position adjacent to an opposite edge opposite to the one edge of the original with the one edge of the original aligning with said second reference position.

6. An image reading apparatus according to claim 1, wherein said first standby position of said image reading unit is a position corresponding to said first image reading position, and said second standby position of said image reading unit is a position corresponding to said second image reading position.

7. An image reading apparatus according to claim 1, wherein a direction in which said image reading unit scans when said image reading unit reads the original stopped at said first image reading position and a direction in which said image reading unit scans when said image reading unit reads the original stopped at said second image reading position are the same.

8. An image forming apparatus comprising:
an image reading apparatus according to claim 1, for reading an image of an original; and
an image forming portion for forming an image on the basis of the image of the original read by said image reading apparatus.

9. An image reading apparatus according to claim 1, wherein said second standby position of said image reading unit is changed in accordance with a length of the original.

* * * * *